United States Patent
Hamdan

(10) Patent No.: US 9,145,893 B2
(45) Date of Patent: Sep. 29, 2015

(54) CURRENT CONTROL VIA SPEED CONTROL FOR DRIVING SCREW COMPRESSOR UNDER COLD CONDITIONS

(75) Inventor: Marv Hamdan, North Olmsted, OH (US)

(73) Assignee: BENDIX COMMERCIAL VEHICLE SYSTEMS LLC, Elyria, OH (US)

(*) Notice: Subject to any disclaimer, the term of this patent is extended or adjusted under 35 U.S.C. 154(b) by 860 days.

(21) Appl. No.: 13/165,019

(22) Filed: Jun. 21, 2011

(65) Prior Publication Data

US 2012/0315151 A1    Dec. 13, 2012

Related U.S. Application Data

(60) Provisional application No. 61/494,491, filed on Jun. 8, 2011.

(51) Int. Cl.

| | |
|---|---|
| *F04C 28/06* | (2006.01) |
| *H02P 29/00* | (2006.01) |
| *H02P 29/02* | (2006.01) |
| *F04C 18/16* | (2006.01) |
| *F04C 28/08* | (2006.01) |

(52) U.S. Cl.
CPC ............ *F04C 28/06* (2013.01); *F04C 18/16* (2013.01); *F04C 28/08* (2013.01); *H02P 29/005* (2013.01); *H02P 29/022* (2013.01); *H02P 29/027* (2013.01); *F04C 2270/07* (2013.01); *F04C 2270/701* (2013.01)

(58) Field of Classification Search
CPC .......... F04C 28/06; F04C 18/16; F04C 28/08; H02P 29/005; H02P 29/027; H02P 29/022
USPC ...................... 417/12, 32, 44.11, 44; 700/282
See application file for complete search history.

(56) References Cited

U.S. PATENT DOCUMENTS

| | | | |
|---|---|---|---|
| 4,581,900 A * | 4/1986 | Lowe et al. | 62/228.1 |
| 5,771,704 A | 6/1998 | Nakajima et al. | |
| 6,016,965 A * | 1/2000 | Yoshimura et al. | 236/35 |
| 6,240,737 B1 | 6/2001 | Albiez | |
| 6,513,341 B2 | 2/2003 | Nakajima | |
| 6,829,893 B2 | 12/2004 | Doerr et al. | |
| 7,127,901 B2 * | 10/2006 | Dresens et al. | 62/77 |
| 7,259,533 B2 * | 8/2007 | Yang et al. | 318/434 |

(Continued)

OTHER PUBLICATIONS

PCT International Search Report and Written Opinion for PCT/US2012/028849; Authorized Officer: Blaine R. Copenheaver; Date of completion: May 29, 2012; Date of mailing: Jun. 20, 2012; 9 pgs.

*Primary Examiner* — Charles Freay
*Assistant Examiner* — Lilya Pekarskaya
(74) *Attorney, Agent, or Firm* — Fay Sharpe LLP

(57) ABSTRACT

When starting a screw-type air compressor in sub-zero conditions, current spikes are mitigated by detecting an overcurrent condition and/or a below-threshold temperature, and a warm-up routine is initiated in which compressor motor speed is ramped in a sawtooth fashion between two speeds that are substantially lower than a nominal operating speed of the compressor motor. In this manner, the internal components of the compressor are warmed prior to fully starting the compressor, which mitigates current spikes, reduces blown fuses, and extends the life of the compressor motor and other compressor components.

20 Claims, 5 Drawing Sheets

(56) References Cited

U.S. PATENT DOCUMENTS

| | | |
|---|---|---|
| 7,273,357 B2 | 9/2007 | Hattori et al. |
| 2002/0170305 A1* | 11/2002 | Nakajima .................... 62/228.4 |
| 2007/0200445 A1* | 8/2007 | Yamagiwa ............... 310/156.32 |
| 2008/0175717 A1* | 7/2008 | Schnetzka et al. ................ 417/3 |
| 2009/0254246 A1* | 10/2009 | Yang et al. ....................... 701/36 |
| 2010/0111707 A1* | 5/2010 | Hamdan et al. .............. 417/44.1 |

* cited by examiner

CURRENT CONTROL VIA SPEED CONTROL FOR DRIVING SCREW COMPRESSOR UNDER COLD CONDITIONS

This application claims priority to U.S. Provisional Application Ser. No. 61/494,491, filed on Jun. 8, 2011, which is incorporated herein.

BACKGROUND

The present application finds particular application in controlling screw-type compressors for commercial hybrid vehicles. However, it will be appreciated that the described technique may also find application in other compressor systems, other vehicular systems, or other control systems.

In conventional screw-type compressors, a pair of helical screws or rotors is employed to compress a gas, such as air. Oil-filled screw compressors employ a lubricant that fills the space between the rotors. The lubricant provides a hydraulic seal and transfers mechanical energy between the screws. Air enters at a suction side and moves through the threads as the screws rotate. In this manner, the rotors force the air through the compressor until it exits at the end of the screws.

Trying to drive a liquid-cooled screw compressor under worst case conditions (e.g., less than −5° F., cold startup, no coolant flow into compressor) presents a challenge to the motor controller. Excessive phase and RMS currents can occur, and conventional control strategies are not able to mitigate the over-current conditions or bring the compressor up to working temperature and speed in order to charge the air tanks without blowing fuses, etc.

The present innovation relates to systems and methods that overcome the above-referenced problems and others.

SUMMARY

In accordance with one aspect, a controller for cold-starting a screw-type compressor while mitigating current spikes includes a processor that executes computer-executable instructions, which are stored on a computer-readable medium, including instructions for starting a compressor motor to run at a first speed, detecting an over-current condition at a first point in time, and reducing the speed of the compressor to a second speed that is less than the first speed. The instructions further include performing, for a first predetermined time period, a warm-up routine wherein the controller provides a warm-up control signal to the compressor motor that causes the compressor motor to repeatedly vary speed between the second speed and a third speed that is greater than the second speed and less than the first speed, and determining whether the over-current condition is present during the warm-up routine. The instructions further include, if the over-current condition is not present at the end of the warm-up routine, signaling the compressor motor to operate at the first speed, and, if the over-current condition is present at the end of the warm-up routine, signaling the compressor motor to stop for a second predetermined time period, after which the warm-up routine is reiterated. The compressor motor is iteratively stopped and subjected to the warm-up routine until the over-current condition is reduced to below a predetermined acceptable current level.

In accordance with another aspect, a method for cold-starting a screw-type compressor while mitigating current spikes includes causing a compressor motor to run at a first speed, detecting an over-current condition at a first point in time, and reducing the speed of the compressor to a second speed that is less than the first speed. The method further includes performing, for a first predetermined time period, a warm-up routine wherein the controller provides a warm-up control signal to the compressor motor that causes the compressor motor to repeatedly vary speed between the second speed and a third speed that is greater than the second speed and less than the first speed, and determining whether the over-current condition is present during the warm-up routine. Additionally, the instructions include, if the over-current condition is not present at the end of the warm-up routine, signaling the compressor motor to operate at the first speed, and if the over-current condition is present at the end of the warm-up routine, signaling the compressor motor to stop for a second predetermined time period, after which the warm-up routine is reiterated. The compressor motor is iteratively stopped and subjected to the warm-up routine until the over-current condition is reduced to below a predetermined acceptable current level.

In accordance with another aspect, a compressor comprising a controller that mitigates current spikes in the compressor during startup in extreme conditions includes a processor that executes computer-executable instructions, which are stored on a computer-readable medium, including instructions for starting a compressor motor to run at a first speed, detecting an over-current condition at a first point in time, and reducing the speed of the compressor to a second speed that is less than the first speed. The instructions further include performing, for a first predetermined time period, a warm-up routine wherein the controller provides a warm-up control signal to the compressor motor that causes the compressor motor to repeatedly vary speed between the second speed and a third speed that is greater than the second speed and less than the first speed, and determining whether the over-current condition is present during the warm-up routine. If the over-current condition is not present at the end of the warm-up routine, the processor signals the compressor motor to operate at the first speed. If the over-current condition is present at the end of the warm-up routine, the processor signals the compressor motor to stop for a second predetermined time period, after which the warm-up routine is reiterated. The compressor motor is iteratively stopped and subjected to the warm-up routine until the over-current condition is reduced to below a predetermined acceptable current level.

One advantage is that mechanical shock to the compressor components is reduced.

Another advantage is that compressor reliability and operational life are improved.

Still further advantages of the subject innovation will be appreciated by those of ordinary skill in the art upon reading and understanding the following detailed description.

BRIEF DESCRIPTION OF THE DRAWINGS

The file of this patent contains at least one drawing executed in color. Copies of this patent with color drawings will be provided by the U.S. Patent and Trademark Office upon request and payment of the necessary fee.

The innovation may take form in various components and arrangements of components, and in various steps and arrangements of steps. The drawings are only for purposes of illustrating various aspects and are not to be construed as limiting the invention.

DETAILED DESCRIPTION

Figure 1:
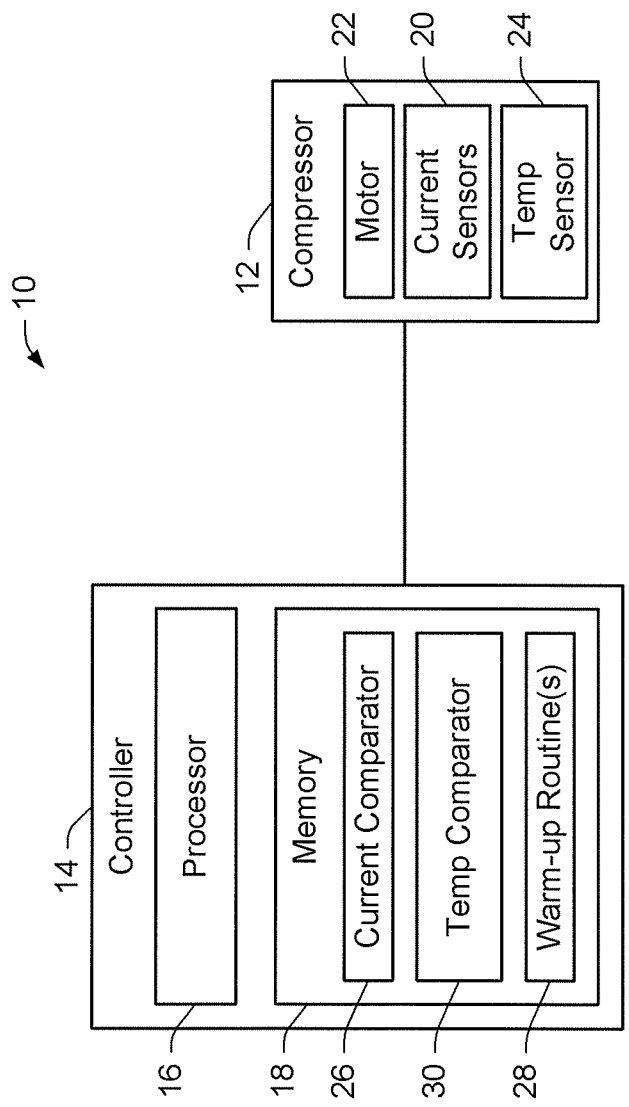
FIG. 1 illustrates an electronic compressor drive system for screw compressors that are located external to a vehicle cab.

FIG. 1 illustrates an electronic compressor drive system 10 for screw compressors that are located external to a vehicle cab. When cold start conditions are detected, high phase and RMS currents can result, causing the compressor to blow a fuse. In order to overcome this problem, in one embodiment, a warm-up routine or procedure is executed in which the compressor is driven for a number (e.g., 3, 4, 5, etc.) of short sawtooth wave cycles to limit high current draw typically associated with cold starts. After the predetermined number of warm-up cycles, the compressor is warm and the regular compressor drive cycles are used to achieve the full normal air charging cycle.

Accordingly, the system 10 comprises a screw-type compressor 12 that is operatively coupled to a compressor motor controller 14. The controller 14 may be integral to the compressor 12 or remote therefrom. The controller includes a processor 16 that executes, and a memory 18 that stores, computer-executable instructions for performing the various functions, methods, techniques, etc., described herein. The system further comprises a DC current sensor 20 (e.g., one or more Hall sensors or the like, which may be positioned on one or more leads coupled to the motor) that monitors the current draw from a compressor motor 22. In one embodiment, the processor 16 (and/or the controller 14) estimates phase current and/or the rms current drawn by the motor as a function of a DC bus current measured by one or more Hall sensors. In another embodiment, the system includes a temperature sensor or thermometer 24 that monitors ambient temperature in the environment in which the compressor is located.

The memory 18 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 16. Additionally, "module," as used herein denotes a set of computer-executable instructions (e.g., a routine, sub-routine, program, application, or the like) that is persistently stored on the computer-readable medium or memory for execution by the processor.

In one embodiment, the controller 14 starts the compressor motor 22, e.g. by sending a startup signal to the motor. The current sensor(s) 20 monitor current drawn by the motor and provide feedback information or signals to the controller 14 and/or the processor 16. The processor executes a current comparator module to compare the current feedback information to a threshold acceptable current level or value (e.g., 30 A or some other predetermined value). If the motor draws an amount of current greater than the threshold level then an over-current condition is present and the controller and/or the processor executes a warm-up routine 28 in order to mitigate the over-current condition.

The warm-up routine 28 comprises a series of warm-up cycles during which the controller 14 and/or the processor 16 sends a sawtooth input waveform to the motor 22 to cause the motor to oscillate within an rpm range below a nominal operational rpm level or speed for the motor. For instance, the sawtooth input waveform cycle may cause the motor to ramp up from 1700 rpm to 1750 rpm and then drop back to 1700 rpm several times over a period of a few hundred milliseconds, followed by a few hundred milliseconds of no input waveform, iterated several times such that the whole warm-up routine has a duration of several seconds. For example, a 5-second warm-up routine may comprise 5 warm-up cycles, each cycle comprising approximately 500 ms of sawtooth input signal and 500 ms of a null signal. Once the warm-up routine 28 is complete, the motor is shut down for several seconds (e.g., 10-12 seconds or some other prescribed period), after which the compressor is started as normal and the motor runs at the nominal speed (e.g., 3000 rpm or some other nominal operational speed) to compress air. This approach can be repeated iteratively such that the controller or processor sends a startup signal to the compressor motor, detects an over-current condition, executes the warm-up routine, shuts down the motor, and sends a subsequent startup signal to the motor repeatedly until the motor starts up without causing an over-current condition. It will be appreciated that the warm-up waveform is not limited to being a sawtooth waveform, but rather may be any suitable waveform (e.g., a triangle waveform, a square waveform, a sinusoidal waveform, a second-order waveform or higher-order waveform, etc.) as will be appreciated by one of skill in the relevant art.

In another embodiment, the temperature sensor 24 (e.g., a thermometer) monitors ambient temperature near the compressor, and the processor 16 and/or the controller 14 executes a temperature comparator module 30 that determines whether the temperature is below a threshold temperature level (e.g., 32° F. or some other predetermined sub-freezing temperature). If the measured temperature is below the threshold temperature level, then the processor 16 and/or the controller 14 executes a warm-up routine 28 prior to starting the compressor motor, in order to warm up the oil in the compressor and mitigate current spikes.

In yet another embodiment, a plurality of warm-up routines 28 of varied durations is stored in the memory. For instance, if the measured temperature is 0° C., then a first warm-up routine having a first duration is executed. If the measured temperature is −20° C., then a second warm-up routine having a second (longer) duration is executed, and so on.

According to an example, a nominal operating speed, or first speed, of the compressor may be considered unity, or 1. In this case during the warm up routine, the speed of the compressor is controlled so that it ramps up from a second speed to a third speed, both of which are substantially less than the first speed. For instance, the second and third speeds may be in the range of approximately 40%-70% of the first or nominal speed. According to a more specific example, and not by way of limitation, if the first speed is 3000 rpm, then the second and third speeds may be set in the range of approximately 1200-2000 rpm or the like, wherein the third speed is approximately 50-100 rpm higher than the second speed. The motor ramps up from the second speed to the third speed iteratively in a sawtooth fashion for several cycles of the warm-up routine. In another example, the warm-up routine has a duration of approximately 1-5 seconds, and is followed by a 9-15 second period in which the motor is in an OFF state.

The over-current condition can be defined as a current spike that is, for instance, 20%-50% higher than a nominal current level when the motor is operating at nominal speed. For example, if normal current draw for the motor is 20 A, then a current draw of 24-30 A can be construed as an over-current condition, depending on where the over-current threshold is set.

Figure 2:
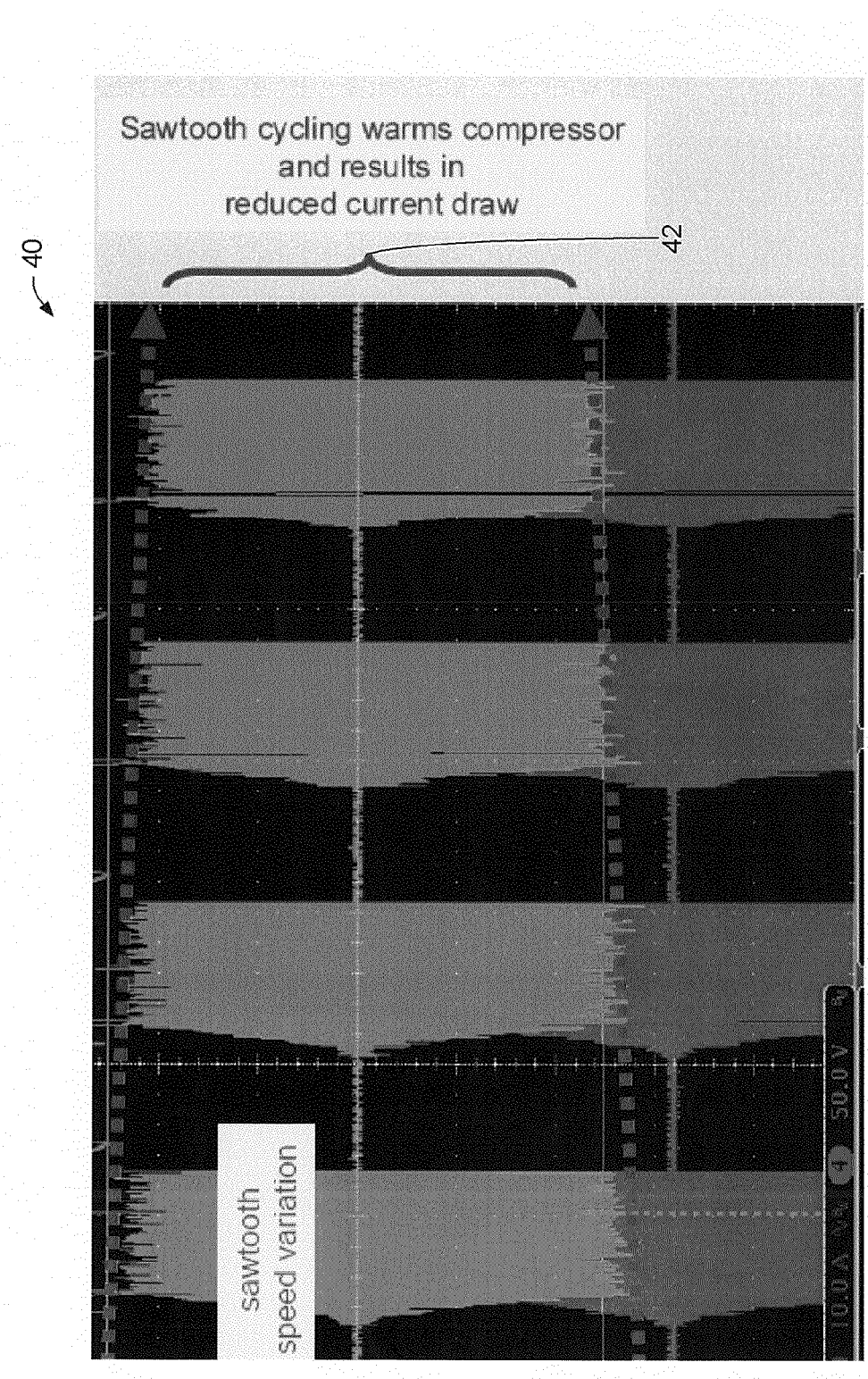
FIG. 2 is a screen shot of a scope output showing diminishing current draw while compressor is warming up.

FIG. 2 is a screen shot 40 of a scope output showing diminishing current draw 42 while compressor is warming up. That is, as the warm-up routine is performed, the compressor motor current draw is reduced, thereby mitigating current spikes, preventing blown fuses, extending motor life, etc.

Figure 3:
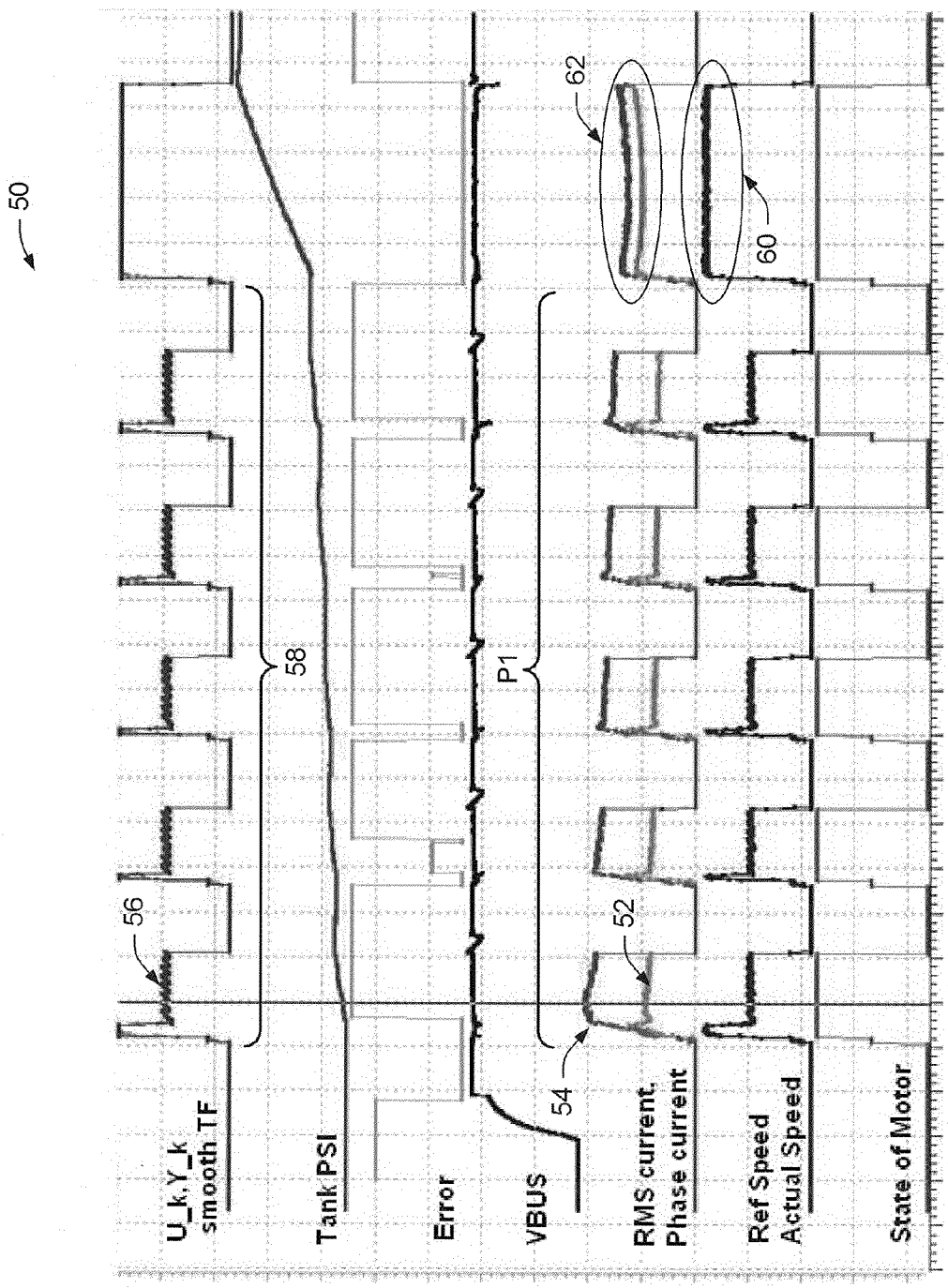
FIG. 3 illustrates a graph of several waveform parameters.

FIG. 3 illustrates a graph 50 of several waveform parameters including an input waveform U_k, Y_k, compressor tank pressure (PSI), an error waveform, a DC bus voltage (VBUS), current drawn by the motor (rms and phase currents), reference speed, measured or actual speed of the motor, and a motor state parameter. The motor is commanded to nominal operation speed 60. The phase current 54 and/or rms current 52 are above a desired level when the warm-up routine is initiated. Therefore, a sawtooth waveform 56 is provided as an input command to the motor to cause the motor speed to oscillate (i.e. ramp up and then drop back down) between two relative low speeds to warm the compressor. The warm-up routine 58 in the illustrated example comprises five sawtooth waveform segments, followed respectively by 5 "off" periods where the motor is not running, which collectively span a first predetermined time period P1 (e.g., 2 seconds, 3 seconds, 5 seconds, etc.). At the end of the warm-up routine, and optionally after a second predetermined time period P2 (e.g., 9 seconds, 12, seconds, 15 seconds, or the like; not shown in FIG. 3) has lapsed, the motor is started normally at a nominal operation speed 60 that is higher than the speeds achieved by the sawtooth warm-up waveforms, and this time, the motor rms and phase current draw 62 is below an acceptable threshold level.

According to one embodiment, phase current sensors are employed on all phases of input current drawn by the compressor motor, and the over-current condition is detected via the sensors. All 3 phase currents can thus be monitored, and the current demand is adjusted when the acceptable current threshold is exceeded. RMS current also can be calculated from these sensors.

In another embodiment, extra sensors to detect excessive current draw are employed. Additionally or alternatively, phase current can be estimated (e.g., by the processor of FIG. 1) from a DC bus current measurement.

Figure 4:
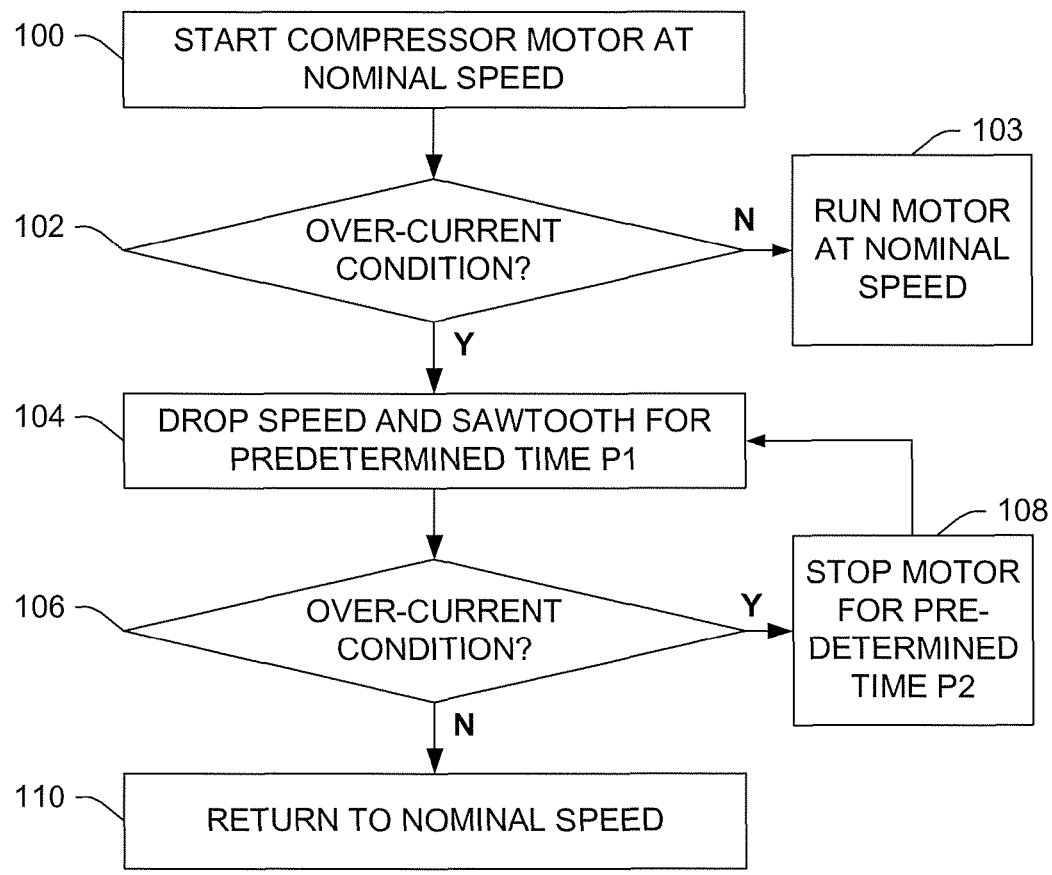
FIG. 4 illustrates a method of compressor motor control using a "sawtooth" speed control signal to mitigate current spikes during startup of a screw-type compressor under extreme conditions (e.g., less than 32° F. or the like).

FIG. 4 illustrates a method of compressor motor control using a "sawtooth" speed control signal to mitigate current spikes during startup of a screw-type compressor under extreme conditions (e.g., in the range of approximately 32° F. down to approximately −40° F. or the like). Cycling the compressor speed in a sawtooth fashion serves to warm the internal components and to reduce current draw at cold operating conditions on the screw compressor. At 100, the compressor motor receives a command to start running at a nominal operational speed, e.g. 3000 rpm or some other nominal speed. At 102, a determination is made regarding whether an over-current condition is present. The determination may be made by analyzing current sensor feedback information or the like. If no over-current condition is present, then at 103 the compressor continues to run at nominal speed. If an over-current condition is detected at 102, then at 104 a warm-up routine is initiated by dropping the compressor motor speed to a predetermined level and "sawtoothing" the motor speed from, e.g., 1700-1750 rpm for a first predetermined time period. As described with regard to the preceding figures, the warm-up routine may comprise several sawtooth waveform cycles, interspersed with gaps wherein the motor receives no input signal or an input signal with no magnitude. For instance, the warm-up routine may comprise several such cycles spanning the first predetermined time period P1, which in one example has a duration of approximately three seconds.

At 106, a determination is made regarding whether the over-current condition is still present. If so, then the motor is stopped for a second predetermined time period P2, at 108. In one example the time period P2 is approximately 12 seconds, although other durations can be employed. The method then reverts to 104 for another iteration of the warm-up routine.

If the determination at 106 indicates that the over-current condition has been resolved, then at 110, the motor is returned to its nominal operating speed. In one embodiment, this is achieved by re-sending a start command that causes the motor to start up and accelerate to its nominal speed. Optionally, the predetermined time period P2 may be allowed to expire between the time of the determination that the over-current condition is resolved and the time of restarting the motor.

Figure 5:
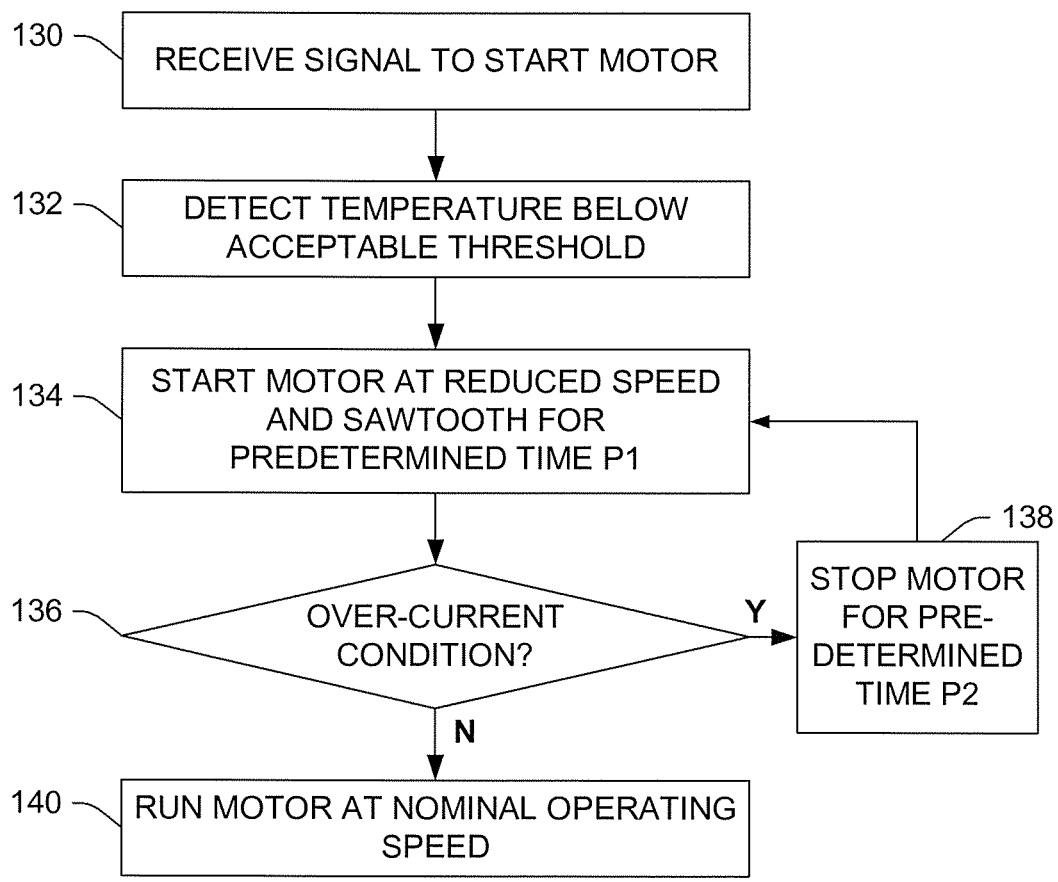
FIG. 5 illustrates a method of compressor motor control using a sawtooth speed control signal to warm up a screw-type compressor under extreme conditions (e.g., less than 32° F. or the like), prior to startup at full speed.

FIG. 5 illustrates a method of compressor motor control using a sawtooth speed control signal to warm up a screw-type compressor under extreme conditions (e.g., in the range of approximately 32° F. down to approximately −40° F. or the like), prior to startup at full speed. At 130, an indication is received that the compressor motor is about to start. At 132, temperature is measured and compared to a threshold acceptable temperature to determine that the temperature of the operating environment in which the compressor is employed is below the threshold temperature level. At 134, a warm-up routine is executed by dropping the compressor motor speed to a predetermined level and "sawtoothing" the motor speed from, e.g., 1700-1750 rpm for a first predetermined time period. As described with regard to the preceding figures, the warm-up routine may comprise several sawtooth waveform cycles, interspersed with gaps wherein the motor receives no input signal or an input signal with no magnitude. For instance, the warm-up routine may comprise several such cycles spanning the first predetermined time period P1, which in one example has a duration of approximately three seconds.

At 136, a determination is made regarding whether the over-current condition is still present. If so, then the motor is stopped for a second predetermined time period P2, at 138. In one example the time period P2 is approximately 12 seconds, although other durations can be employed. The method then reverts to 134 for another iteration of the warm-up routine.

If the determination at 136 indicates that the over-current condition has been resolved, then at 140, the motor is returned to its nominal operating speed. In one embodiment, this is achieved by re-sending a start command that causes the motor to start up and accelerate to its nominal speed. Optionally, the predetermined time period P2 may be allowed to expire between the time of the determination that the over-current condition is resolved and the time of restarting the motor.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A controller for cold-starting a screw-type compressor while mitigating current spikes, including:
   a processor that executes computer-executable instructions, which are stored on a computer-readable medium, including instructions for:
   starting a compressor motor to run at a first speed;
   detecting an over-current condition at a first point in time;
   reducing the speed of the compressor to a second speed that is less than the first speed;
   for a first predetermined time period providing a warm-up control signal to the compressor motor and causing the compressor motor to repeatedly vary speed between the second speed and a third speed that is greater than the second speed and less than the first speed;
   determining whether the over-current condition is present during warm-up routine;
      wherein if the over-current condition is not present at the end of the warm-up routine, signaling the compressor motor to operate at the first speed; and
      wherein if the over-current condition is present at the end of the warm-up routine, signaling the compressor motor to stop for a second predetermined time period, after which the warm-up routine is reiterated; and
      iteratively stopping the compressor motor and subjecting the compressor motor to the warm-up routine until the over-current condition is reduced to below a predetermined acceptable current level.

2. The system according to claim 1, wherein the warm-up control signal is a sawtooth wave control signal.

3. The system according to claim 1, wherein the warm-up control signal is one of a triangle wave control signal, a square wave control signal, and a sinusoidal wave control signal.

4. The system according to claim 1, wherein detecting the over-current condition is performed by one or more Hall sensors coupled to the compressor motor.

5. The system according to claim 1, further comprising at least one of:
   detecting the over-current condition on a phase current drawn by the compressor motor; and
   detecting the over-current condition on an RMS current drawn by the compressor motor.

6. The system according to claim 1, wherein the second and third speeds are in the range of 1200 rpm to 2000 rpm.

7. The system according to claim 1, wherein the first predetermined time period is in the range of 1 second to 5 seconds.

8. The system according to claim 1, wherein the second predetermined time period is in the range of 9 seconds to 15 seconds.

9. The system according to claim 1, wherein the over-current condition includes a current spike that is in the range of 20% to 50% higher than a nominal current drawn by the compressor motor to run the motor at the first speed.

10. A method for cold-starting a screw-type compressor while mitigating current spikes, including:
    causing a compressor motor to run at a first speed;
    detecting an over-current condition at a first point in time;
    reducing the speed of the compressor to a second speed that is less than the first speed;
    for a first predetermined time period, providing a warm-up control signal to the compressor motor and causing the compressor motor to repeatedly vary speed between the second speed and a third speed that is greater than the second speed and less than the first speed;
    determining whether the over-current condition is present during the warm-up routine;
       wherein if the over-current condition is not present at the end of the warm-up routine, signaling the compressor motor to operate at the first speed; and
       wherein if the over-current condition is present at the end of the warm-up routine, signaling the compressor motor to stop for a second predetermined time period, after which the warm-up routine is reiterated; and
       iteratively stopping the compressor motor and subjecting the compressor motor to the warm-up routine until the over-current condition is reduced to below a predetermined acceptable current level.

11. The method according to claim 10, wherein the warm-up control signal is a sawtooth control signal.

12. The system according to claim 10, wherein the warm-up control signal is one of a triangle wave control signal, a square wave control signal, and a sinusoidal wave control signal.

13. The method according to claim 10, wherein detecting the over-current condition is performed by one or more Hall sensors coupled to the compressor motor.

14. The method according to claim 10, further comprising at least one of:
    detecting the over-current condition on a phase current drawn by the compressor motor; and
    detecting the over-current condition on an RMS current drawn by the compressor motor.

15. The method according to claim 10, wherein the second and third speeds are in the range of 1200 rpm to 2000 rpm.

16. The method according to claim 10, wherein the first predetermined time period is in the range of 1 second to 5 seconds.

17. The method according to claim 10, wherein the second predetermined time period is in the range of 9 seconds to 15 seconds.

18. A non-transitory computer-readable medium having stored thereon computer-executable instructions for performing the method of claim 10.

19. The method according to claim 10, wherein the over-current condition includes a current spike that is in the range of 20% to 50% higher than a nominal current drawn by the compressor motor to run the motor at the first speed.

20. A compressor comprising a controller that mitigates current spikes in the compressor during startup in extreme conditions, including:
    a processor that executes computer-executable instructions, which are stored on a computer-readable medium, including instructions for:
    starting a compressor motor to run at a first speed;
    detecting an over-current condition at a first point in time;
    reducing the speed of the compressor to a second speed that is less than the first speed;
    for a first predetermined time period, providing a warm-up control signal to the compressor motor and causing the compressor motor to repeatedly vary speed between the second speed and a third speed that is greater than the second speed and less than the first speed;
    determining whether the over-current condition is present during the warm-up routine;
       wherein if the over-current condition is not present at the end of the warm-up routine, signaling the compressor motor to operate at the first speed; and wherein if the over-current condition is present at the end of the warm-up routine, signaling the compressor motor to stop for a second predetermined time period, after which the warm-up routine is reiterated;

iteratively stopping the compressor and subjecting the compressor motor to the warm-up routine until the over-current condition is reduced to below a predetermined acceptable current level.

* * * * *